United States Patent Office 3,415,755
Patented Dec. 10, 1968

3,415,755
THICKENED PAINT STRIPPERS
Herbert O. Luck, Midland, Mich., assignor to The Dow Chemical Company, Midland, Mich., a corporation of Delaware
No Drawing. Filed Jan. 6, 1965, Ser. No. 423,846
4 Claims. (Cl. 252—171)

The present invention relates to a solvent composition useful for removing paint, varnish, lacquer and in general a wide variety of organo soluble coatings. More particularly the invention involves a thickened aliphatic halide composition.

As taught by Greminger et al. in U.S. Patent 3,094,491, volatile organic solvents employed to remove protective coatings often evaporate before their solvating action can take effect. To minimize such evaporation losses, the patent teaches the use of hydroxyalkyl alkyl cellulose ethers as thickeners for the organic solvent. While the patent teaches the use of these ethers to thicken a halogenated aliphatic solvent, such as methylenechloride, without the presence of methanol as a mutual solvent, the industry prefers to use methanol, usually in the amount of 10–15 percent by weight of the thickened composition, to maximize the thickening achieved with the cellulose ether.

The methanol containing compositions, however, suffer from the disadvantage that they are highly flammable and thus hazardous for many uses. The flammability can be reduced by decreasing the amount of methanol used, but this decreases the efficiency of the cellulose ether as a thickener.

It is an object of the present invention to provide a solvent composition of reduced flammability useful as a paint stripper and, in particular, it is an object to provide such a composition, having a reduced amount of methanol, efficiently thickened with a cellulose ether. These, and other objects as will be apparent hereinafter, are accomplished in the present invention.

The present invention is based upon the discovery that in thickening solvent compositions comprising a halogenated aliphatic organic solvent and from about 1 up to about 5.5 percent by weight of a lower alcohol by dispersing therein a hydroxyalkyl alkyl cellulose ether, the thickening effect achieved can be enhanced by reducing the particle size of the ether used. In such ethers the alkyl group contains from 1 to 3 carbons and the hydroxyalkyl group contains from 2 to 4 carbons. The lower alcohols include methanol, ethanol and propanol. By so limiting the amount of the alcohol used, the composition is made significantly less flammable.

It is contemplated herein that "reducing the particle size of the ethers" is in comparative reference to the ether particle size which is conventional to this application today. Manifestly, what is conventional will vary with the product type and its source, but it is believed the particulate cellulose ether utilized in this thickening application today is largely retained, i.e., 50% or more retained, on a 100 mesh screen of the U.S.S. screen size series. Thus the reduced particle size of the ether under the invention will generally be at least small enough to substantially pass through a 100 mesh screen, preferably a 200 mesh screen, of the U.S.S. screen size series. "Substantially pass" means greater than about 60 percent of the particulate cellulose ether is small enough to pass through the screen.

The cellulose ethers used herein are further characterized by the property of being soluble in water, but only swellable in a methylene chloride-methanol mixture containing 1.5 weight percent methanol. Whether a cellulose ether is swellable in the specified solvent mixture is readily ascertained by dispersing a quantity of it in the solvent. If it uniformly disperses to form discrete gels or a grainy translucent viscous compositon, the ether is swellable, that is, not completely soluble in the solvent.

To thicken the specified solvent mixture, as little as about 0.1 weight percent up to as much as 5 weight percent of the ether is effective. Usually the amount of ether employed is within the range from about 0.5 up to about 2 weight percent based on the weight of the solvent composition to be thickened.

The ethers useful herein are readily prepared by known etherification techniques wherein the extent of etherification and relative amounts of alkyl and hydroxyalkyl etherification are controlled to provide the desired solubility properties. The general preparation of such ethers is described by Savage in U.S. Patent 2,949,452. Preferred herein is a hydroxybutyl methyl cellulose ether having a hydroxybutyl degree of substitution within the range from about 0.05 to about 0.2 and a methyl degree of substitution within the range from about 1.5 to about 2.1.

The ethers obtained according to conventional reaction techniques must be specially ground to provide the reduced particle size necessary to the present invention. This can be accomplished by any convenient particle size reduction technique such as by ball milling the solid ethers to a particle size small enough to substantially pass through a 100, preferably 200 mesh screen, of the U.S.S. screen series. The smaller the particle size the more efficient will be the thickening effect achieved with the swellable ethers.

EXAMPLE 1

In a specific embodiment of the invention, two hydroxybutyl methyl cellulose ethers, each being swellable in methylene chloride having dissolved therein 1.5 percent by weight methanol and differing only in viscosity grade, i.e., one having a viscosity in water of 70,000 centipoises (hereinafter Ether A) and the other a viscosity in water of 17,300 centipoises (hereinafter Ether B), were divided into two aliquots. The water solution viscosities of the ethers were determined from a 2 percent water solution of the ether at 20° C.

One aliquot of each ether was subjected to ball milling in a dry, solid state until the particle size of the ether was small enough to substantially pass a 100 mesh screen. The water viscosity of the ball milled Ether A was 16,000 centipoises and that of Ether B was 7,800 centipoises. As would be expected, the ball milling significantly decreased the water solution viscosity of the ether, i.e., the ability of the ether to thicken a solvent in dissolved form. Dispersions of the methylene chloride swellable ethers were then prepared in a series of organic solvents consisting of methylene chloride-methanol mixtures with increasing amounts of methanol. To each solvent mixture was added 1 percent by weight of the ether. The resulting Brookfield viscosities are reported in the following table:

TABLE 1

| Ether composition | H₂O viscosity (centipoises) | Solvent with indicated MeCl₂/MeOH weight ratio (cps.) | | | | |
|---|---|---|---|---|---|---|
| Ether A | 70,000 | 19 | 520 | 1,840 | 3,040 | 4,200 |
| Ether A, ball milled | 16,000 | 92 | 1,730 | 3,040 | --- | 3,700 |
| Ether B | 17,300 | 46 | 640 | 880 | 1,620 | 1,460 |
| Ether B, ball milled | 7,800 | 134 | 1,530 | 2,140 | --- | 1,100 |

In the foregoing it will be observed that to optimize the viscosity effect, it was necessary to utilize methanol which enhanced the swelling of the cellulose ether in the methylene chloride, and thus, its thickening effect. Contrary to expectation, however, considering the water viscosity of the ether, with and without ball milling, the ball milled, lower viscosity material is to a highly surprising degree much more effective as a thickener than the coarser but higher viscosity material when employed to thicken the methylene chloride containing from about 1 percent up to about 5.5 percent by weight of methanol based on the weight of the solvent composition.

In a manner similar to the foregoing, other mixed hydroxyalkyl alkyl cellulose ethers, which are soluble in water and swellable in the specified methylene chloride-methanol solvent mixture such as hydroxypropyl methyl cellulose, hydroxyethyl ethyl cellulose, hydroxyethyl methyl cellulose, which ethers are in the form of a powder fine enough to substantially pass a 100 mesh screen, preferably a 200 mesh screen of the U.S.S. mesh series can be substituted for the above powdered hydroxybutyl methyl cellulose ethers to achieve a comparable result.

Likewise, other halogenated aliphatic solvents having from 1 to 4 carbons such as chloroform, ethylene dichloride, 1,2-propylene dichloride, 1,2-butylene dichloride, methyl bromide and the like halogenated aliphatic solvents miscible with small amounts of a lower alcohol can be substituted for methylene chloride used above to achieve comparable results.

EXAMPLE 2

This example further demonstrates the advantages to be gained in thickening essentially halogenated organic solvents with water soluble ethers only swellable therein by further reducing the particle size of the ethers. A hydroxybutyl methyl cellulose ether, which was swellable in a 98.5/1.5 mixture of methylene chloride and methanol respectively, was ball milled in the dry state to reduce its particle size. The ball milled ether was then classified into two aliquots, the first of which passed 40 mesh but was retained on a 60 mesh screen, hereinafter Aliquot A, and the second of which passed a 140 mesh but was retained on a 200 mesh screen, hereinafter Aliquot B. One percent by weight of each ether aliquot was dispersed in a series of methylene chloride-methanol solvent mixtures and the resulting viscosity determined with a Brookfield viscosimeter at approximately 73° F.

The results of this test are reported in Table II which shows the Brookfield viscosity of the compositions as a function of methanol content in the methylene chloride-methanol mixtures. It will be observed that the viscosity advantage due to a smaller particle size is lost at a methanol content of about 5.5 weight percent. This represents the methanol content at which the soluble viscosity effect of the ether supercedes its swellability viscosity effect.

TABLE II

| Ether | Solvent mixture with indicated MeCl₂/MeOH weight ratio (cps.) | | | |
|---|---|---|---|---|
| | 97/3 | 95.5/4.5 | 94/6 | 90/10 |
| "A" | 96 | 600 | 1,720 | 2,600 |
| "B" | 190 | 820 | 1,600 | 1,820 |

What is claimed is:

1. A thickened composition of matter consisting essentially of a powdered hydroxyalkyl alkyl cellulose ether, wherein the alkyl group contains from 1 to 3 carbons and the hydroxyalkyl group contains from 2 to 4 carbons dispersed in a solvent mixture of a halogenated aliphatic hydrocarbon solvent having from 1 to 4 carbons and from about 1 up to about 4.5 percent by weight based on the weight of the solvent of methanol carbon atoms, said cellulose ether being present in an amount from about 0.1 percent up to about 5 percent, based on the weight of the solvent mixture, and said cellulose ether being of reduced particle size small enough to pass a 100 mesh screen of the U.S.S. screen series.

2. A thickened composition of matter consisting essentially of a water soluble, powdered hydroxyalkyl alkyl cellulose ether characterized as being swellable in methylene chloride containing 1.5 weight percent of methanol, and wherein the alkyl group contains from 1 to 3 carbons and the hydroxyalkyl group contains from 2 to 4 carbons dispersed in a solvent mixture of a halogenated aliphatic hydrocarbon solvent having from 1 to 4 carbons and from about 1 up to about 4.5 percent, based on the weight of the halogenated solvent, of methanol, said cellulose ether being present in an amount from about 0.1 percent up to about 5 percent, based on the weight of the solvent mixture and said cellulose ether having a particle size small enough to pass a 100 mesh screen of the U.S.S. screen series.

3. A composition of matter as in claim 2 wherein the halogenated solvent is methylene chloride.

4. A composition of matter as in claim 2 wherein the cellulose ether is a hydroxybutyl methyl cellulose having a hydroxybutyl degree of substitution within the range from about 0.05 up to about 0.2 and a methyl degree of substitution within the range from about 1.5 up to about 2.1.

References Cited

UNITED STATES PATENTS

| 2,531,825 | 11/1950 | Peterson et al. | 252—163 |
| 3,094,491 | 6/1963 | Greminger et al. | 252—171 |
| 3,218,263 | 11/1965 | Boule et al. | 252—316 |

OTHER REFERENCES

Alexander, Colloid Chemistry, vol. 6, Reinhold Publ. Co. (1946).

LEON D. ROSDOL, *Primary Examiner.*

W. E. SCHULZ, *Assistant Examiner.*

U.S. Cl. X.R.

252—163, 316; 134—38

UNITED STATES PATENT OFFICE
CERTIFICATE OF CORRECTION

Patent No. 3,415,755                                  December 10, 1968

Herbert O. Luck

It is certified that error appears in the above identified patent and that said Letters Patent are hereby corrected as shown below:

Columns 1 and 2, TABLE 1, insert as the sub-headings to columns three, four, five, six and seven, -- 98.5/1.5 --, --97.3 --, --95.5/4.5 --, -- 4/6 -- and -- 90/10 --. Column 4, line 9, after "methanol", cancel "carbon toms".

Signed and sealed this 17th day of March 1970.

(SEAL)
Attest:

Edward M. Fletcher, Jr.
Attesting Officer

WILLIAM E. SCHUYLER, JR.
                                              Commissioner of Patents